United States Patent [19] [11] 4,214,489
Ahlen et al. [45] Jul. 29, 1980

[54] MULTI-SPEED PLANETARY GEAR

[75] Inventors: Karl G. Ahlén, Bromma; Per-Olof Bergström, Ektorp; Joseph Supanich, Stockholm, all of Sweden

[73] Assignee: S.R.M. Hydromekanik Aktiebolag, Stockholm-Vallingby, Sweden

[21] Appl. No.: 714,287

[22] Filed: Aug. 13, 1976

[30] Foreign Application Priority Data

Jan. 29, 1976 [GB] United Kingdom ............... 3572/76
Apr. 30, 1976 [DE] Fed. Rep. of Germany ....... 2619011

[51] Int. Cl.² ........................................... F16H 57/10
[52] U.S. Cl. ................................ 74/761; 74/750 R; 74/260
[58] Field of Search ............ 74/801, 760, 761, 750 R, 74/731, 759, 740; 192/85 CA

[56] References Cited

U.S. PATENT DOCUMENTS

| 1,773,699 | 8/1930 | Wasbauer | 74/750 R |
| 1,998,891 | 4/1935 | Benson | 74/750 R |
| 2,220,174 | 11/1940 | Ravigneaux | 74/759 |
| 2,369,422 | 2/1945 | Williams | 74/801 |
| 2,598,501 | 5/1952 | Burnett | 74/760 |
| 2,603,327 | 7/1952 | King | 74/750 R |
| 2,609,708 | 9/1952 | Burnett | 74/760 |
| 3,073,179 | 1/1963 | Christenson | 74/731 |
| 3,684,069 | 8/1972 | Pray | 192/85 CA |
| 3,721,135 | 3/1973 | Kelley | 74/761 |
| 3,799,003 | 3/1974 | Vandest | 74/740 |
| 3,862,581 | 1/1975 | O'Malley | 74/761 |
| 3,907,085 | 9/1975 | Rist | 192/85 CA |
| 4,051,933 | 10/1977 | Beneke | 192/85 CA |

Primary Examiner—Ira S. Lazarus
Assistant Examiner—R. C. Turner
Attorney, Agent, or Firm—Larson, Taylor and Hinds

[57] ABSTRACT

A multi-speed planetary gear including a planet gear carrier connected to one of the primary or secondary shafts, planet gears mounted thereon, each including at least two gear surfaces at different diameters. At least three annular gears, i.e. sun or ring gears, engage said gear surfaces. One of these is a drive annular gear engaged with the primary or secondary shaft other than the one to which the planet carrier is engaged. Each of the other annular gears, i.e. other than the drive annular gear, is connectable against rotation relative to the casing by a friction brake and a servo-motor means, which servo-motor means are mounted non-rotatively relative to the casing. The force of at least one servo-motor, preferably the one effecting a direct drive connection is transmitted across axial thrust bearings through a slidable annular gear and a lever means. The remaining annular gears are selectively connectable to the casing for various types of drive including different ratio forward drives and reverse drive.

37 Claims, 10 Drawing Figures

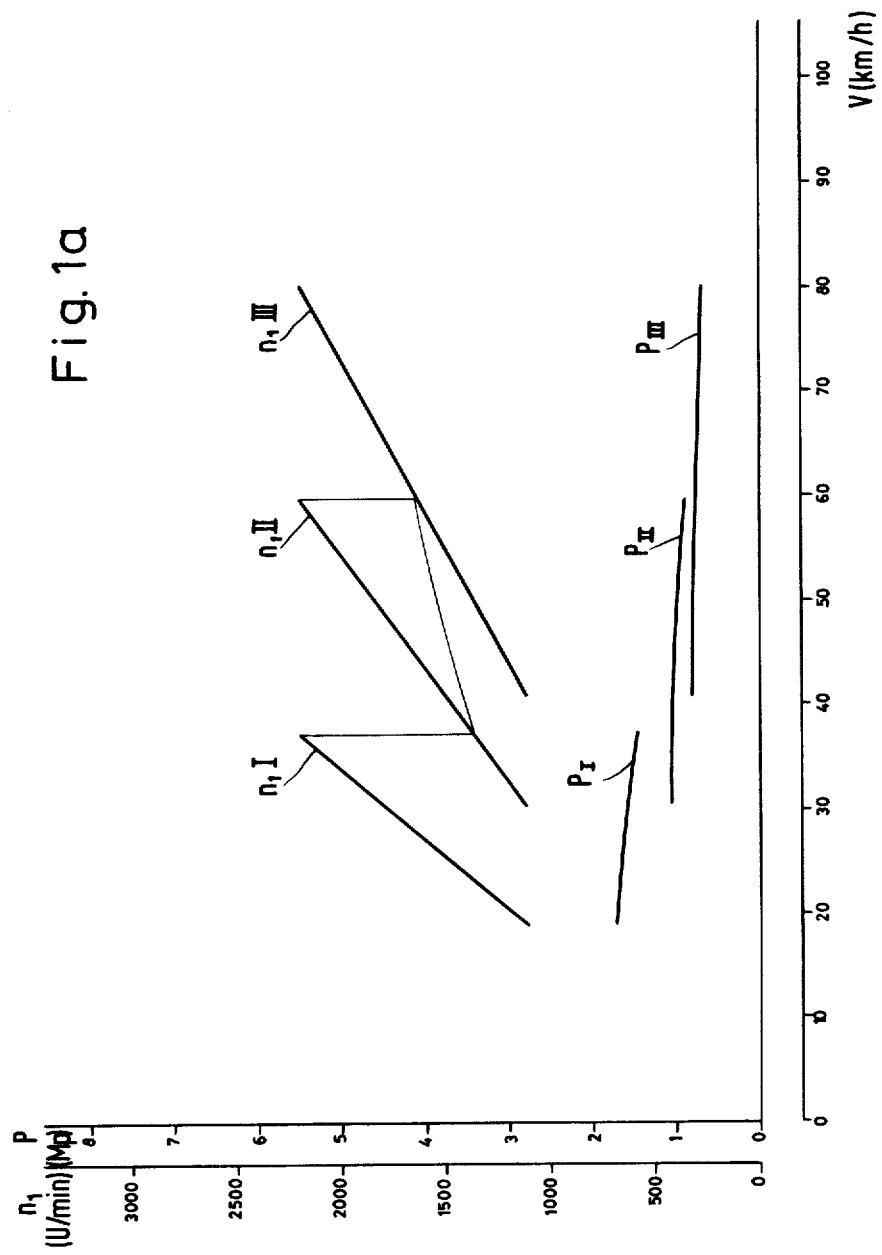

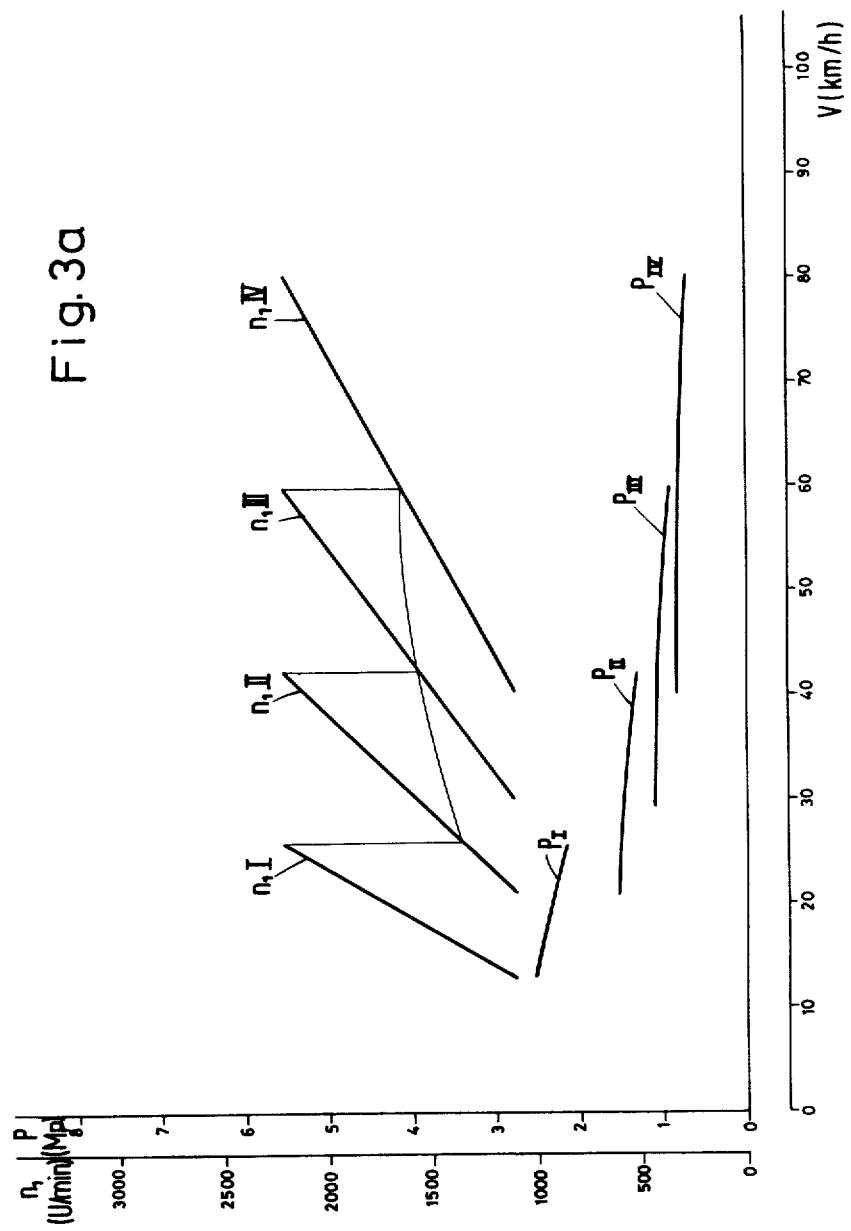

MULTI-SPEED PLANETARY GEAR

This invention concerns a multi-speed planetary gear for motor driven vehicles having a planet gear carrier carrying one or more planetary gears, each of which has at least two gear surfaces of different diameters which engage inner sun and/or outer ring gears.

It is well known to use such planetary gears as step gears in vehicles, especially passenger cars, trucks and lorries, buses, earth-moving equipment and locomotives. However, known transmissions of this type which satisfy the requirements of such vehicles are comparatively complicated and comparatively large and expense to make. Further, in the known transmissions of this type servo-motors provided for engaging and disengaging various clutchs and brakes are generally built into the rotating parts to rotate therewith. It is difficult to control the sealing, filling and emptying of these rotating servo-motors and still achieve satisfactory gear changes for the total life of the vehicle and if one does not wish to be limited to the use of low pressure oils. Especially unsatisfactory is the influence of rotary paraboloids occuring during gear shift conditions. Rotating seals, normally of the piston ring type, are necessary together with the rotating servo-motors and they are quite limited in the level of oil pressure which they allow so that a large, high pressure oil pump is normally required for actuation of such servo-motors.

It is therefore a purpose of the present invention to provide a multi-speed planetary gear of the type discribed providing small dimensions at a low manufacturing cost while simultaneously eliminating the above discribed disadvantages of known planetary gear transmissions while obtaining stable gear shift conditions during the life of the transmission especially to the extent that the same are influenced by the oil pressure level, and it is a further aim of the invention to provide these advantages without the necessity for using a large oil pump for high oil pressures.

This purpose of the invention is achieved by using a planetary gear transmission having at least three annular gears. For purposes of this application, the sun and ring gears are referred to collectively herein as "annular gears". One of these gears is connected to the primary or input shaft while the planet carrier is operatively engaged with the secondary or output shaft. The remaining annular gears are selectively fixed with respect to the casing by a suitable friction coupling to provide a different type of drive between the primary and secondary shafts, i.e. forward drives of different ratios or reverse drive. Preferably, direct drive from the primary shaft to the secondary shaft is provided by a servo-motor stationarily mounted with respect to the casing and acting through a lever system.

By driving through an annular gear and having a planet gear carrier with planet gears with at least two gear diameters on each shaft, side by side, together with which the annular gears are working, which annular gears can be stalled relative to the casing by friction brakes, it is possible to obtain suitable gear ratios while also locating the brake surfaces on comparatively large diameters. This makes it possible to provide sufficiently high synchronizing capacity when making gear shifts over more than one step, and it also makes it possible to use only stationary servo-motors having high oil pressures with a small capacity resulting in low leakage. This is especially important in combination with hydraulic torque converters. In other words, as the brake servo-motors are arranged in the stationary casing of the transmission it is possible to have tight seals and a small high pressure gear pump, especially when filling the servo-motor with low pressure and building up the pressure with a high pressure pump.

With a gear transmission according to the present invention is it not only possible to have gear steps in one direction for both overdrive and underdrive and a gear for the opposite driving direction, but it is also possible to have a direct drive connection between the primary and secondary shafts, said connection comprising a friction coupling directly between the primary shaft and the planet carrier locking up the whole planetary gear and carrying torque over the planet gears, such direct drive being actuated from a stationary servo-motor. The connection of the direct drive clutch is made by using lever arms journalled in the planetary gear carrier to actuate a coupling ring to close the coupling when the opposite sides of the lever arms are actuated by the stationary servo-motor, which servo-motor acts over one or more bearings which press on the lever arms. By this arrangement the necessary force to close the coupling is reduced so far that a small stationary piston can be used to create the force and to allow this force to be carried over the lever arms over small bearings, for instance axial needle bearing.

In one form of the invention the driving annular gear is a ring gear in mesh with the largest of the planet gears and the remaining annular gears are sun gears. With this arrangement and a suitable selection of gear sizes there is provided a suitable gear ratio for a large number of applications. To provide also the direct drive connection, operated by a stationary servo-motor, it is possible to use the sun gear having the smallest diameter as a sleeve carrying over the axial force from the stationary servo-motor. However this force can also be carried over by a separate sleeve to reduce the speed of the axial bearings, for instance at engine testing and reverse.

In another form of the invention the primary shaft is connected to a sun gear and the remaining annular gears in connection with the planet gears are ring gears in gear mesh on the outer side of the planet gears. With this arrangement it is possible to obtain essentially higher gear ratios than in the first example.

In both arrangements it is possible to obtain reverse drive and/or overdrives by adding annular gears in contact with the remaining unused planet gear sides, which will in the first case be a ring gear and in the second case a sun gear, said other annular gears each having their own servo-motor actuated brakes. If reverse gear or overdrive is obtained depends on the position of the gear used and the diameters of the gears.

With a planet gear in accordance with the present invention having only two gear diameters on each planet gear it is possible to obtain two gear ratio reductions and one reverse, i.e. besides direct drive there are three different annular gears to stall. With such an arrangement it may be difficult to obtain the desired gear ratios, especially in reverse, and also the smallest gear may not provide sufficient gear ratio. In fact, it may happen that the reverse gear is obtained even with an increase of speed and this is only possible to use in certain applications. Normally, a reverse gear ratio of about the same size as the lowest gear ratio may be wanted. Such reverse gear ratio can be obtained by adding a third gear on each planet gear with a smaller diameter than the other two and an annular gear in mesh with this third gear. If such annular gear is a further sun gear with its own friction brake then the two gear ratio reductions will become three gear ratio reductions and a reverse drive, i.e. in addition to direct drive, such drives being provided by three sun gears with their brakes and one ring gear with its brake where the ring gear provides reverse drive with a high gear ratio.

The planet gear in the planetary gear in question can be manufactured in a favorable way, if the gear with the larger diameter is mounted on the gear with smaller diameter using the tooth profile of the latter as a spline connection. The large gears must then have their tooth profiles simultaneously machined for each set and must be mounted in a certain relationship by assembling the planetary gear and the teeth with the relationship to the inner gear have to be similarly mounted in the gear set.

When making planet gears with three diameters it is normally favorable to have the planet gear of at least the two smaller gears made in one piece and to have a bearing surface between the two smaller gears and one outside the largest gear. The bearings should preferably be roller bearings or needle bearings.

As mentioned above, with a planetary gear transmission according to the present invention it is possible to have the brakes and the coupling on relatively large diameters making it easy to provide sufficiently large friction surfaces and to avoid unacceptably high connection forces. Under these circumstances, it may be possible to make the brakes and the couplings with single disc, which provides favorable low drag losses. Normally, sinter metal linings are preferred, especially for high H.P.-units and high speed units. Single discs also make it possible to have the servo-motor move only short distances with small oil quantities to fill and empty without the need for unacceptably high fluid pressures.

The drag torque on the brakes and/or the coupling can be widely reduced by using friction discs being sine waved in the direction of rotation preferably with a maximum of 0.2 mm wave height. This will create an air bearing and make unnecessary large lubrication oil quantities.

The objects and advantages of the present invention will become apparent from the detailed description to follow, taken together with the accompaning drawings in which:

FIG. 1A is a graph showing tractive effort and engine speed in different gear steps in relation to the vehicle speed for one application of the transmission of FIG. 1.

FIG. 3A is a graph showing tractive effort and engine speed in different gear ratios in relation to the vehicle speed for one application of the transmission of according to FIG. 3.

Referring now to the drawings, like elements are represented by like numerals throughout the several views. Also, in all of the figures, the primary shaft is marked with the letter I and the secondary shaft is marked with the letter O and the transmission casing is marked with the letter H.

Figure 1:
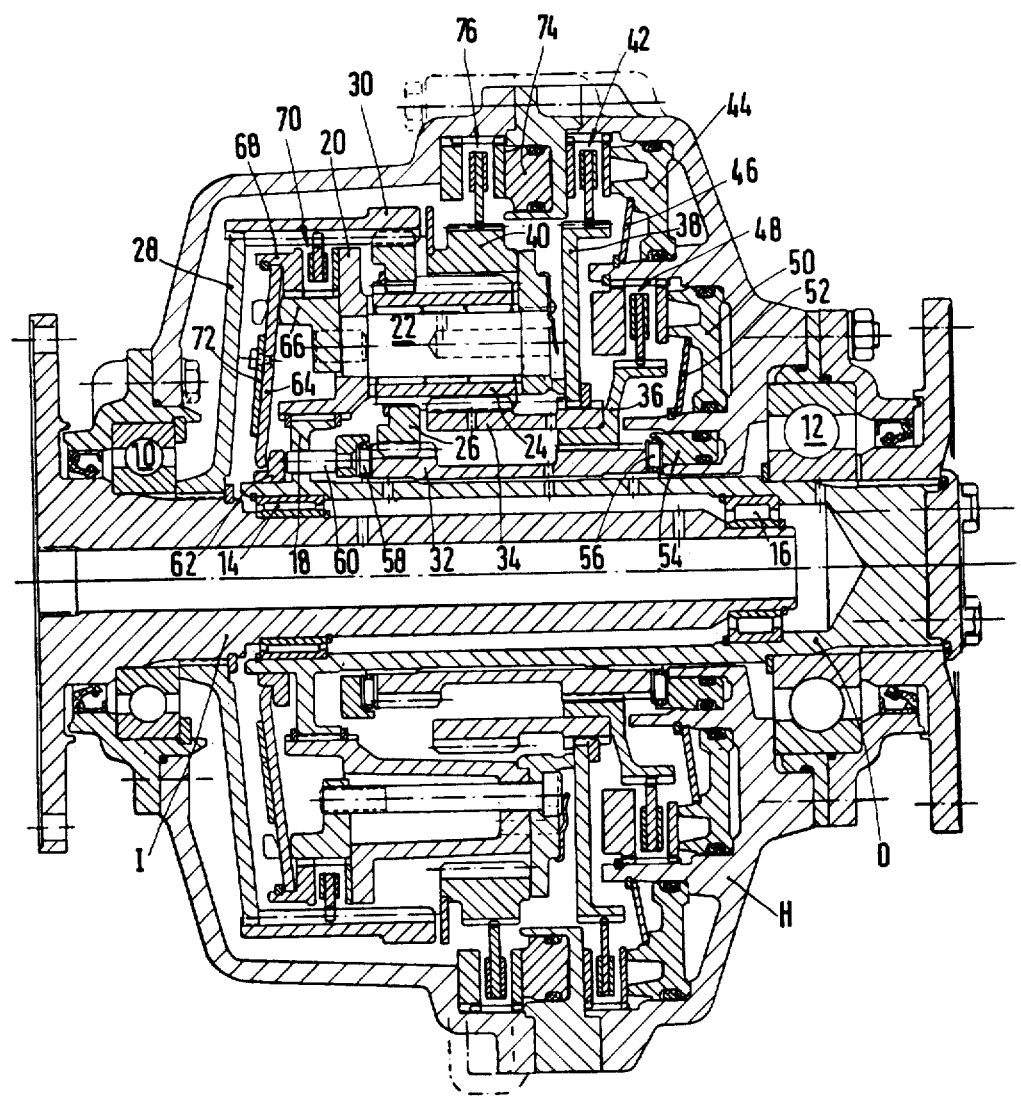
FIG. 1 is a longitudinal sectional view through a planetary gear transmission consructed in accordance with the present invention and having three forward gear steps and one reverse gear.

The transmission according to FIG. 1 is a 3-speed gear with two forward gear reduction speeds, a direct drive connection and a reverse gear. The primary shaft I is journalled in casing H by means of a bearing 10 via a secondary shaft O through a bearing 12. Further, the input shaft I extends into an opening in the secondary shaft O and is journalled therein in bearings 14 and 16. A flange 18 on the secondary shaft O carries on a spline a planet carrier 20, in which shafts 22 are mounted, on which gears 24 of a relatively small diameters are journalled. In the cross-section of FIG. 1 only one such shaft is shown and another can be seen, but there will normally be at least three such shafts. Each such gear 24 carries on its spline a second gear 26 of larger diameter but with a smaller axial length in such a way that the larger gear 26 covers only a part of the smaller gear, whereby the planet gear has two different gear surfaces.

A thin conical shaped disc 28 is mounted on the primary shaft I. On a spline connection on the periphery of this disc 28 is mounted the ring gear 30. This ring gear 30 is in tooth connection with the larger planet gears 26. A sleeve-formed second annular gear 32 is journalled on the secondary shaft O and is a sun gear in connection with the larger planet gear part 26. A third annular gear, also a sun gear 34 is journalled on a flange which is in spline connection with the sun gear 32 and is in gear connection with the smaller of the planet gears. The sun gear 34 carries a flange 38. Further, another annular gear, namely ring gear 40 is in mesh on the outside of the smaller planet gears 24.

The flange 38 carries on an outer spline one friction disc for the first disc brake 42 for stalling the sun gear 34 in relation to the casing H. Connection of the disc brake 42 is provided by annular piston 44, which opposes a Belleville spring 46 which urges piston 44 to the released position. Similarly the disc 32 is in spline connection with a friction disc of a secondary disc brake 48 for connecting the sun gear 32 to the casing H when actuating the annular piston 50, which is urged towards its release condition by a Belleville spring 52. The annular pistons 44 and 50 are mounted in cylindrical cavities on the inside of the casing H and the Bellesville springs 46, 52 are at their radial inner side axially fixed in the casing by circlips or the like.

A third annular piston 54 having a small diameter is also mounted in a cylindrical cavity in the casing H. This piston 54 works over a first axial needle bearing 56 against a not only rotatable, but also axially movable sleeve, journalled on the secondary shaft O, on the sun gear 32, which sleeve at its other end works over a second axial needle bearing 58 against ring 62 via spacer pieces 60 which extend into and through holes in the flange 18 of the secondary shaft O thereby moving axially the ring 62. The axial bearings 56, 58 as shown are needle bearings with relatively short needles. Instead of these bearings however, one can use other types of bearings, for instance the bearing 56 may be a friction bearing and the bearing 58 an angle contact ball bearing.

The spacer pieces 60 move upon movement and force exerted from the sleeve 32 to the ring 62. The ring 62 in turn acts against on a number of radial levers 64, which pass through cut-outs in a cylindrical part 66 of the planet gear carrier 20 and the lever arm outside the planet gear holder acts against a ring 68. This ring 68 is one of the side rings in a disc friction coupling 70 between the annular ring gear 30 and the planet carrier 20 to obtain direct drive connection between the primary shaft I and the secondary shaft O. The disc clutch 70 will then be closed when the servo-piston 32 is actuated and for release of this connection there is provided a Belleville type spring 72, which acts on the lever arms urging them to take a radial position, also urging the needle bearings into contact and moving the piston 54 towards the right hand position and moving the disc 68 to the left. In the casing H there is provided a further cylindrical cavity with a piston 74, by means of which a friction disc mounted on the ring gear 40 forms a disc brake 76 in the casing H.

The friction surfaces of the disc brakes 42, 48, 76 and of the disc coupling 70 should preferably have sinter metal linings and the surfaces of the cooperating discs should preferably have in the tangential direction a slight sine form with an amplitude of maximum 0.2 mm and suitably there should be 3 or 4 waves around the circumference of the disc. This arrangement will give an exceptionally low drag torque for the rotating coupling or brakes, especially at high speeds.

By alternative connections of the coupling and the brakes 42, 48, 70, 76, three forward gear ratios and one reverse ratio are obtained as follows:

I. Brake 42 connected: high reduction (e.g. 1.9:1)
II. Brake 48 connected: low gear ratio (e.g. 1.37:1)
III. Coupling 70 connected: direct drive (1:1)
R. Brake 76 connected: gear ratio in reverse (e.g. 0.61:1)

The coupling and the brakes are actuated by stationary servo-motors. The coupling and the brakes have relatively large diameters making them suitable to take up high torque. The use of the axially movable sun gear 32 to carry over the force from a stationary servo-piston 52 through a lever system to close the direct drive coupling makes it possible to make the servo-motor on a small diameter. This means that a small force is carried over the rotating bearings and the stationary servo-motor itself eliminates the necessity of rotating seals, which in turn makes it feasible to use high pressure.

FIG. 1A shows in a graph the primary speed $n_1$ and the tractive effort P for different vehicles speeds in the three speed ranges 1, 2 and 3 when using the transmission according to FIG. 1 in a truck with a FIAT-engine of 210 H.P. at 2,000 r.p.m. The vertical lines between the speed lines show shift points at maximum speed in a lower gear to a high gear.

Figure 2:
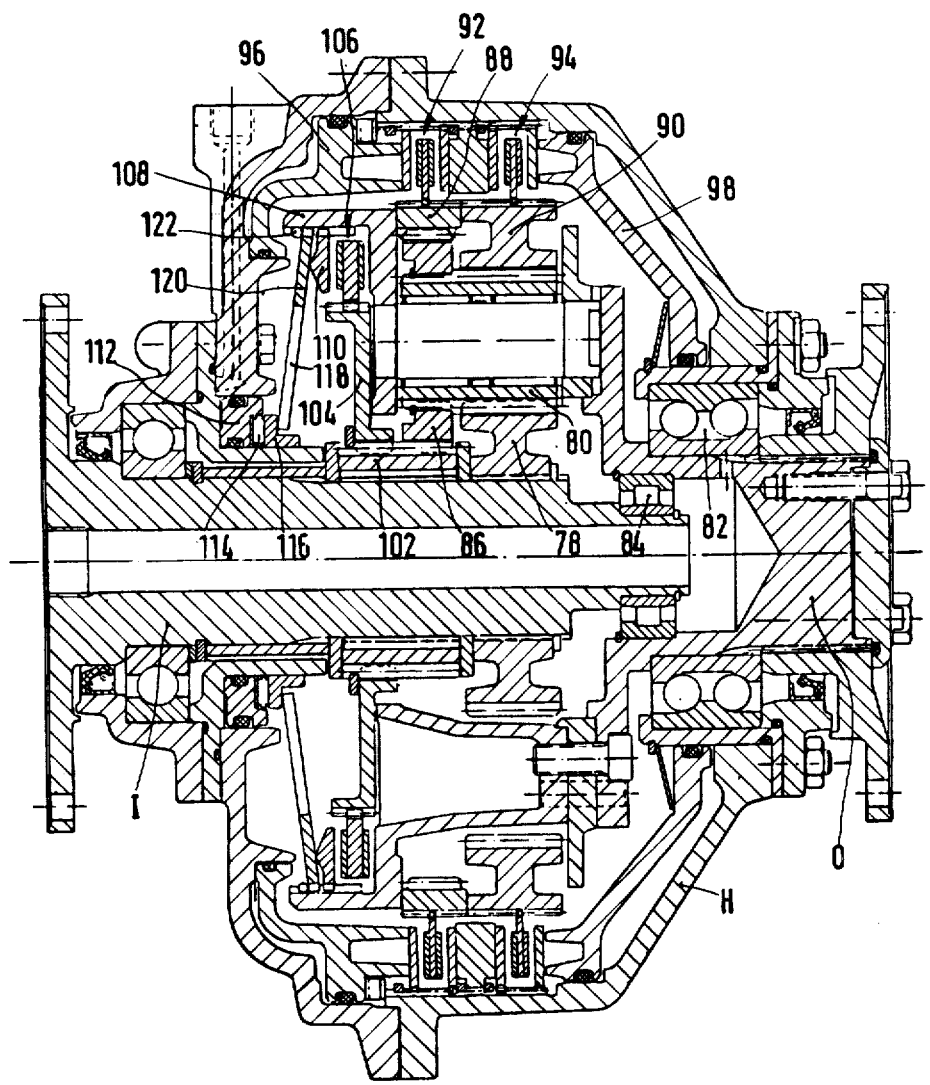
FIG. 2 is a longitudinal sectional view through another embodiment of the invention including three forward gear steps and no reverse.

The arrangement according to the invention shown in FIG. 2 differs from the one shown on FIG. 1, mainly in that the drive annular gear is not a ring gear in mesh on the outside of the planets but a sun gear 78 in mesh on the inside of the planets and as shown with the smallest diameter planet gears 80 and further because no reverse gear is included. The planet gear carrier is journalled in a bearing 82 in the casing H and the primary shaft is journalled to the casing via a ball bearing 84 and the output shaft.

In the arrangement according to FIG. 2 as in FIG. 1, there are provided planet gears having two diameters, the smaller gears 80 and the larger 86 and the tooth profiles of 80 are utilized as part of a spline connection to 86.

To obtain the two different gear ratios the larger planet gear 86 is in contact with a ring gear 88 and the smaller gear 80 works together with a ring gear 90. The ring gears can alternatively be connected to the casing H by the disc brakes 92 or 94, respectively by means of the annular pistons 96, 98, respectively. A further sun gear 102 is journalled on the primary shaft I and carries rotationally fixed therewith a disc 104, which in turn carries the friction disc of a friction coupling 106 to connect the sun gear 102 to the planet gear carrier 108 for direct drive.

This friction coupling 106 is actuated by a servo piston 112 located on the primary side, which acts over an axial thrust needle bearing 114 and a ring 116 to connect the coupling 106 by actuating a radial lever system 118, which has radial directed spokes or a Belleville spring 120, which on the left side of its outer periphery abuts against a stop 122 in the planet carrier and which, when moved acts against the pressure ring 110 having a ring-formed abutment. By means of this lever arm the necessary force from the annular piston 112 is reduced several times. In this case is it possible directly to actuate the lever system and to put the piston on the primary side.

With a transmission in accordance with FIG. 2 three transmission steps are obtained:

I. Brake 92 connected: large reduction (for example 2.9:1)
II. Brake 94 connected: lower gear ratio (for example 2.3:1)
III. Coupling 106 connected: direct drive (1:1)

Comparing the gear ratios for FIGS. 1 and 2 it is found that the arrangement according to FIG. 2 has much higher gear ratios.

Figure 3:
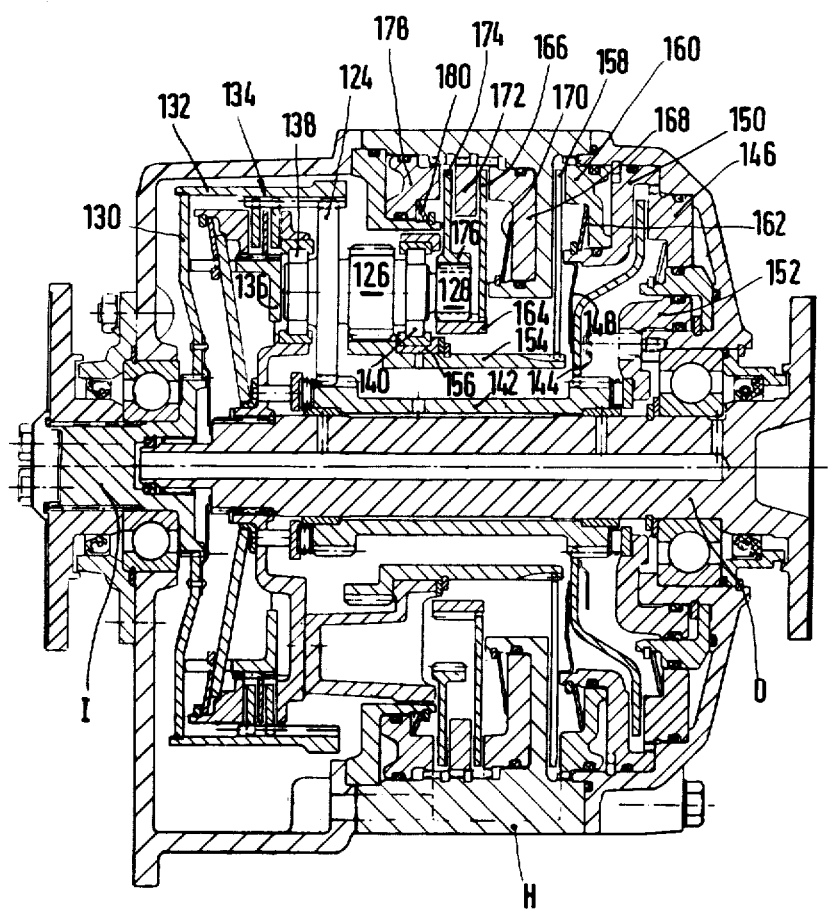
FIG. 3 is a longitudinal sectional view of another embodiment of the invention having four forward gear steps and one high ratio reverse gear.

FIG. 3 shows a form of the planetary gear according to the invention, which differs from what is shown in FIGS. 1 and 2 basically in that the planet gears have three sizes of gears 124, 126 and 128. Obviously, it is possible even here to put the largest gear in spline connection to the next largest gear. The different gears of the planets work together with a maximum of five annular gears. The largest ring gear works together with the largest gear on the planet as the drive annular gear, i.e. a primary gear. A further ring gear works together with the smallest planet gear and further three sun gears are possible, each separately connectable to the casing H. By locking alternatively one of these sun gears or the ring gear there are obtained three forward gear ratios and one in reverse, where the reverse has a comparatively large ratio. Further, even here the direct drive can be used, in other words it is a 4-speed and reverse planetary gear arrangement.

More specifically the transmission according to FIG. 3 has the following design:

The short primary shaft I drives over a hub 130 a sleeve-formed ring gear 132 in mesh with the large diameter gear 124 of the planet gear. The ring gear is also one part of the disc coupling 134 to connect the ring gear 132 with the planet gear carrier 136 to obtain a direct drive connection between the the primary shaft I and the planet gear carrier 136, which is connected to the output shaft. In the lower part of the figure it can be seen that the planet gear holder 136 constitutes two parts and in the upper part it can be seen that each one of the parts of the planet gear carrier has roller bearings 138, 140, in which the planet gears are journalled. The inner races of the roller bearings 138, 140 are part of the planet gears while the outer races are mounted in the planet gear carrier.

Journalled on the secondary shaft O is a first sleeve-formed sun gear 142, which on its left hand side is gear-formed and in mesh with the largest of the planet gears 124 and at its opposite end has a similar gear form carrying a friction disc 144, which by means of piston 146 against the force of the spring 148 and against the abutment 150 connects the friction disc 144 to the casing H. The sun gear 142, in a manner similar to the sun gear 32 of the transmission according to FIG. 1 is displaced axially by a servo piston 152 for actuating the friction coupling 134 for connection of the direct drive. Further, a sleeve-formed sun gear 154 is over a plane bearing 156 journalled in the planet gear carrier 136 and at its end of the sun gear 154 carries a fixed disc 158 rotationally fixed to it, which by means of an annular piston 160 against the force of a disc spring 162 is connectable to the casing H. A third sun gear 164 is in gear mesh with the smallest of the planet gears 128 and carries a friction disc 166, which by means of an annular piston 168 is connectable to the casing H against the abutment 172. The piston is, when released, forced back by the Belleville spring 170. Finally, ring gear 176 is in mesh with the smallest of the planet gears 128 on the outer side and this ring gear is formed to have a friction disc 174, which by means of piston 178 against the abutment 172 is connectable to the casing H. The Belleville spring 180 returns the piston 178 when released.

The friction discs 144, 158, 166 and 174 with their servo pistons form brakes to connect the sun gears 142, 154, 164 and the ring gear 176 with the casing H and together with the direct drive clutch 134 constitute the following gear connections:

I. Brake 144 connected: the largest gear reduction (for example 3.2:1)
II. Brake 158 connected: medium gear reduction (for example 1.95:1)
III. Brake 166 connected: the smallest gear reduction (for example 1.32:1)
IV. Friction coupling 134 connected: direct drive (1:1)
R. Brake 174 connected: reverse drive (for example 1.8:1)

As can be seen from the drawings the planet gear 124 has more than three times the diameter of the smallest planet gear 128, where 124 works together with the ring gear 132 and the planet gear 128 work together with the ring gear 176. This large difference is necessary to provide a high gear ratio in reverse. Should the difference be used for the gear with only two sizes on the planet gears, i.e. should the gear in the middle 126 with the sun gear 154 be eliminated, then the step in gear ratios would go directly from 3.2:1 to 1.32:1. Such a gear would for most cases be unsuitable but can very well be of interest for special cases. The shape of the planet gears consisting of three gears and the extra sun gear connectable to the casing for one more gear ratio is, therefore, for most of the applications not necessary if not a high gear ratio and reverse should be obtained.

FIG. 3A shows in a diagram similar to FIG. 1A the primary speed $n_1$ and the tractive effort P over vehicle speeds for the four drives I, II, III and IV for the transmission according to FIG. 3 when used as with FIG. 1A in a truck with a FIAT engine of 210 H.P. at 2,000 r.p.m. The vertical lines between the maximum speed points of one gear to the next following higher gear show maximum allowed shift points and also for this maximum reduction necessary in engine speed.

Figure 4:
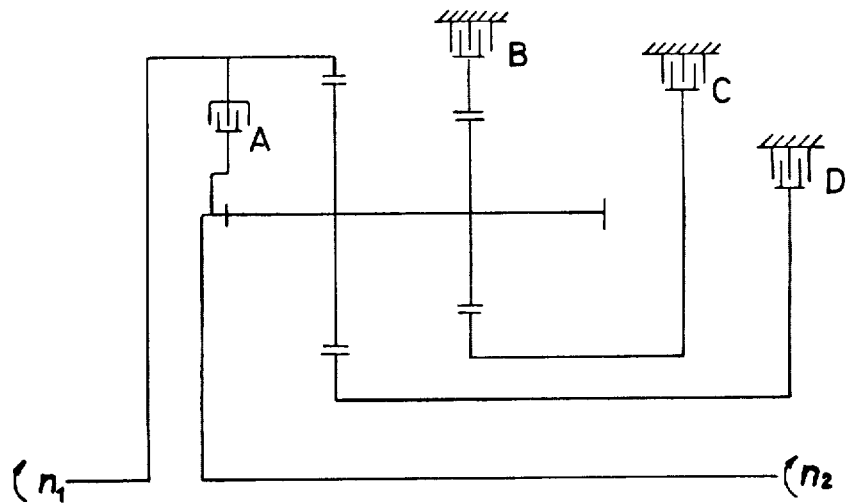
FIG. 4 is a schematic representation of the transmission arrangement according to FIG. 1.
Figure 5:
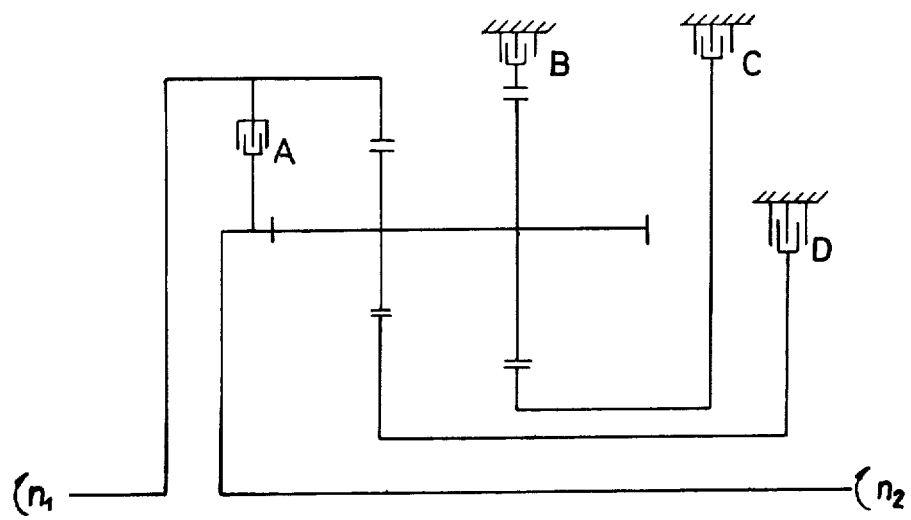
FIG. 5 is a schematic representation of a gear transmission according to FIGS. 1 and 4 but modified to provide two forward gear steps, a direct drive connection and overdrive connection.
Figure 6:
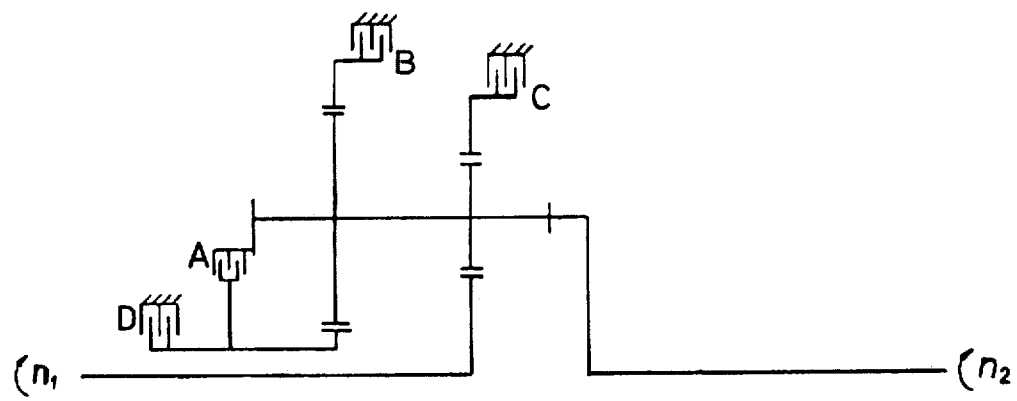
FIG. 6 is a schematic representation of the transmission of FIG. 2 but modified to include an additional overdrive.

FIG. 4 shows again schematically the principle of the transmission according to FIG. 1, where the direct drive clutch 70 is marked as A and the three brakes 76, 42 and 48 are marked as B, C, and D respectively. The following characteristics exist:
D: Low reduction
C: High reduction
A: Direct drive
B: Reverse gear FIG. 5 shows schematically a modification of the transmission according to FIGS. 1 and 4 in that the large and small planet gears are interchanged, as also the diameters of the annular gears are of course also changed accordingly. By this arrangement is the following characteristics are obtained:
D. Large reduction
C. Small reduction
A: Direct drive
B: Overdrive FIG. 6 shows schematically a transmission according to FIG. 2, where the direct drive clutch 106 is marked with A and the brakes 92, 94 are shown as B and C, respectively. In this case, however, as a variation of FIG. 2, a further brake D is provided to stall the sun gear 102 in gear mesh with the largest of the planet gears 86. The following characteristics will be obtained:
C: Low reduction
B: High reduction
A: Direct drive
and with the use of the extra brake
D: Overdrive.

The transmission according to FIG. 6 differs from the transmission according to FIG. 5 by a relatively high reduction in the first and second gear and a not very high overdrive, while the transmission in accordance with FIG. 5 has a useful overdrive since only a relatively small reduction in the first and second gear is provided.

Figure 7:
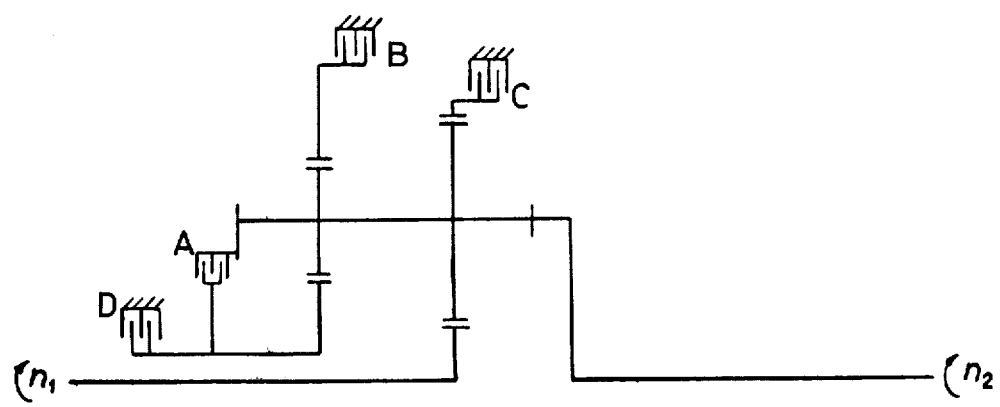
FIG. 7 is a schematic representation of the same transmission as shown in FIG. 6 but modified to include a reverse gear.
Figure 8:
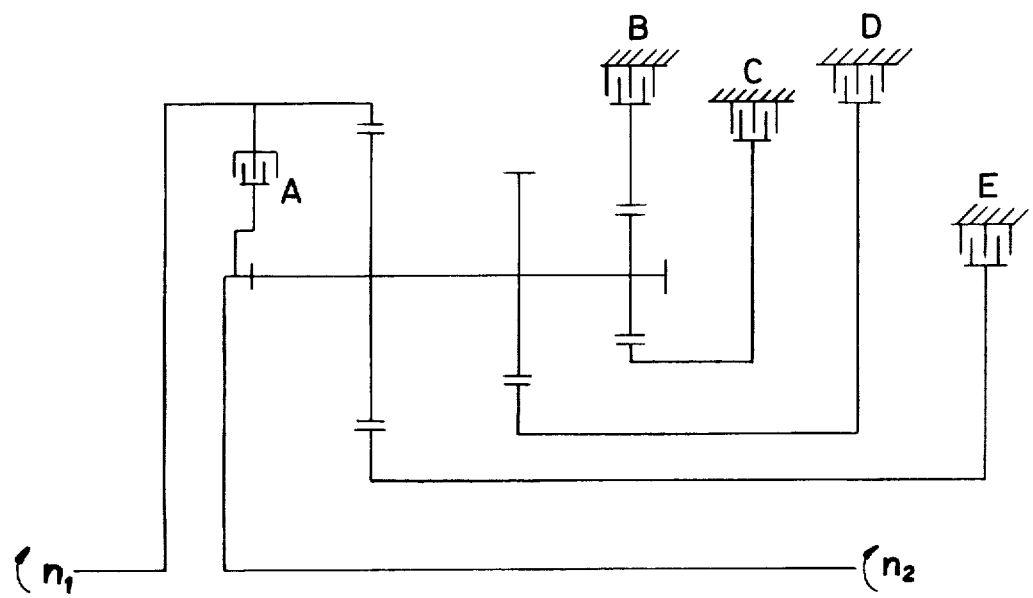
FIG. 8 is a schematic representation of the transmission shown in FIG. 3.

The schematically shown arrangement of FIG. 7 corresponds to FIG. 6 with the large and small planet gears exchanged and with a corresponding change of the corresponding annular gears. By this arrangement the following characteristics are obtained:
B: High reduction
C: Smaller reduction
A: Direct drive
D: Reverse gear Finally, FIG. 8 shows schematically a transmission according to FIG. 3, where the coupling 134 is shown as A and with the brakes 174, 166, 158 and 144 shown respectively as B, C, D and E. The following characteristics then obtained:
C: High reduction
D: Medium reduction
E: Small reduction
A: Direct drive
B: Reverse gear.

In FIG. 8 the planet gears are schematically shown as journalled on the outside, which differs from the journalling according to FIG. 3 and requires a larger stiffness of the planet gears.

The selection of one of the diagrammatic arrangements, FIGS. 4–8, depends on the use and the required gear ratios for the application. Further, it is naturally possible to vary the gear ratios by varying the diameters of the gears relatively seen to obtain an optimal result.

The multi-speed gear according to the present invention can be used alone or in combination with a hydrodynamic mechanical transmission. The invention is especially useful in combination with a torque convertor having a releasable pump member of a type as shown for example U.S. Pat. No. 3,893,551 or a torque convertor with a releasable turbine member as shown for example in previous U.S. Pat. No. 3,839,864, or with a torque convertor using the guide vane in one range referred to as double rotation, wherein the guide vanes rotate in a direction opposite to the turbine blades.

Although the invention has been described in considerable detail with respect to preferred embodiments thereof, it will be apparent that the invention is capable of numerous modifications and variations apparent to those skilled in the art, without departing from the spirit and scope of the invention, as defined in the claims.

We claim:

1. A multi-speed planetary gear comprising, a casing, a primary shaft and a secondary shaft, each of said shafts being journalled with respect to the casing, a planet carrier drivingly connected to one of said shafts, at least one planet gear rotatively mounted on said planet carrier, said planet gear having at least two gear surfaces of different diameters, at least three annular gears, one of said annular gears being a drive annular gear in the form of a ring gear engaged with the shaft other than the shaft with which the planet carrier is drivingly connected, each of the remaining annular gears being engageable with one of the planet gear surfaces, such that each gear surface has at least one annular gear engageable therewith, coupling means associated with each of said remaining annular gears for connecting it against rotation relative to the casing, and a coupling means for connecting the primary and secondary shafts together for direct drive, and including servo-motor means for connecting each of the said coupling means, each of said servo-motor means being mounted in the casing against rotation relative to the casing.

2. A multi-speed planetary gear according to claim 1, said coupling means for direct drive being a friction coupling means for drivingly engaging the planet carrier to the said other of said shafts for direct drive.

3. A multi-speed planetary gear according to claim 2, including bearings for journalling said annular gears, and the force path from the direct drive servo-motor to said direct drive friction coupling passing over at least one said bearings.

4. A multi-speed planetary gear according to claim 3, said bearings across which the servo-motor force is transmitted being axial thrust bearings, and including a lever means for receiving the force of the direct drive servo-motor and transmitting said force to close the said direct drive friction coupling.

5. A multi-speed planetary gear according to claim 4, including a spring means for urging the said direct drive friction coupling to the disengaged position and concurrently loading said axial thrust bearings.

6. A multi-speed planetary gear according to claim 5, said spring means being a Belleville spring.

7. A multi-speed planetary gear according to claim 4, said axial thrust bearings being needle bearings.

8. A multi-speed planetary gear according to claim 4, said axial thrust bearings being plane bearings.

9. A multi-speed planetary gear according to claim 1, the said remaining annular gears including at least two sun gears, each of said sun gears engaging a different one of said planet gear surfaces.

10. A multi-speed planetary gear according to claim 1, said coupling means for direct drive being a friction coupling means for drivingly engaging the planet carrier with said other of said shafts for direct drive, and including bearings for journalling said annular gears, and the force path from the direct drive servo-motor to said direct drive friction coupling passing over at least one of said bearings, said remaining annular gears including at least two sun gears, each with a different diameter, and the sun gear with the smallest diameter being movable axially to convey the said direct drive servo-motor force to the direct drive friction coupling.

11. A multi-speed planetary gear according to claim 10, wherein one of said rotary bearings is located between said direct drive servo-motor and said axially movable sun gear.

12. A multi-speed planetary gear according to claim 11, said bearings across which the servo-motor force is transmitted being axial thrust bearings, and including a lever means for receiving the force of the direct drive servo-motor and transmitting said force to close the said friction coupling, including one of said rotary bearings located between the slidible sun gear and the said lever means.

13. A multi-speed planetary gear according to claim 1, wherein one of the remaining annular gears is located, taken in a radial direction, on the same side of the planet gear or gears as the drive annular gear, to provide a reverse drive or overdrive from the primary shaft to the secondary shaft.

14. A multi-speed planetary gear according to claim 1, wherein the larger diameter gear surface comprises a separate gear mounted on splines formed by axial extensions of the gear teeth of a smaller diameter gear which forms the smaller gear surface.

15. A multi-speed planetary gear according to claim 14, wherein at least one tooth of the larger gear has the same angular position as one tooth of the smaller gear and said gears are mounted with said tooth profiles aligned in a radial direction.

16. A multi-speed planetary gear according to claim 15, wherein the smaller diameter gear surfaces are journalled on the planet gear carrier.

17. A multi-speed planetary gear according to claim 1, wherein each planet gear includes three gear surfaces, each having a different diameter.

18. A multi-speed planetary gear according to claim 17, wherein the largest gear surface is engaged with the drive annular gear, and wherein the smallest of said gear surfaces is engaged with an annular gear, located, in a radial direction, on the same side of the planet gear or gears, to provide a high ratio reverse gear.

19. A multi-speed planetary gear according to claim 18, wherein the three gear surfaces are formed as one piece, said one piece also having a bearing surface for rotary journalling of said piece.

20. A multi-speed planetary gear according to claim 18, including a planet gear shaft portion located between said largest and smallest gear surfaces, said bearing located on said shaft portions and journalling the planet gear shaft in the planet carrier.

21. A multi-speed planetary gear according to claim 1 each of said couplings, including a friction brake including a single friction disc.

22. A multi-speed planetary gear according to claim 21, wherein the friction surfaces of the brakes are of sinter metal.

23. A multi-speed planetary gear according to claim 21, wherein the surfaces of the friction disc are wave formed in the direction of rotation.

24. A multi-speed planetary gear according to claim 23, wherein the amplitude of the waves are at a maximum 0.2 mm.

25. A multi-speed planetary gear according to claim 1, wherein the primary shaft is engaged with the drive annular gear and the secondary shaft is engaged with planet carrier.

26. A multi-speed planetary gear according to claim 25, wherein one of the said remaining annular gears is a sun gear engaged with the same gear surface as the drive annular gear, and including both a ring gear and a sun gear engaging a second of said gear surfaces.

27. A multi-speed planetary gear according to claim 26, the gear surface engaging the drive annular being the largest diameter gear surface.

28. A multi-speed planetary gear according to claim 26, wherein the gear surface engaging with the drive annular gear is the smallest diameter gear surface.

29. A multi-speed planetary gear according to claim 26, including a third gear surface and including a sun gear engaging the said third gear surface.

30. A multi-speed planetary gear comprising a casing, a primary shaft and a secondary shaft, each of said shafts being journalled with respect to the casing, a planet carrier drivingly connected to one of said shafts, at least one planet gear rotatively mounted on said planet carrier, said planet gear having three gear surfaces, each having a different diameter, at least three annular gears, one of said annular gears being a drive annular gear engaged with the shaft other than the shaft with which the planet carrier is drivingly connected, each of the remaining annular gears being engageable with one of the planet gear surfaces, such that each gear surface has at least one annular gear engageable therewith, coupling means associated with each of the said remaining annular gears for connecting it against rotation relative to the casing, and including servo-motor means for connecting each of the said coupling means, each of said servo-motor means being mounted in the casing against rotation relative to the casing, wherein the largest gear surface is engaged with the drive annular gear, and wherein the smallest of said gear surfaces is engaged with an annular gear, located, in a radial direction, on the same side of the planet gear or gears, to provide a high ratio reverse gear.

31. A multi-speed planetary gear according to claim 30, wherein the three gear surfaces are formed as one piece, said one piece also having a bearing surface for rotary journalling of said piece.

32. A multi-speed planetary gear according to claim 30, including a planet gear shaft portion located between said largest and smallest gear surfaces, said bearing located on said shaft portions and journalling the planet gear shaft in the planet carrier.

33. A multi-speed planetary gear comprising a casing, a primary shaft and a secondary shaft, each of said shafts being journalled with respect to the casing, a planet carrier drivingly connected to one of said shafts, at least one planet gear rotatively mounted on said planet carrier, said planet gear having three gear surfaces, each having a different diameter, at least three annular gears, one of said annular gears being a drive annular gear engaged with the shaft other than the shaft with which the planet carrier is drivingly connected, each of the remaining annular gears being engageable with one of the planet gear surfaces, such that each gear surface has at least one annular gear engageable therewith, coupling means associated with each of the said remaining annular gears for connecting it against rotation relative to the casing, and including servo-motor means for connecting each of the said coupling means, each of said servo-motor means being mounted in the casing against rotation relative to the casing, and including a planet gear shaft portion located between the largest and smallest gear surfaces, bearings located on said shaft portions and journalling the planet gear shaft in the planet carrier.

34. A multi-speed planetary gear according to claim 33, said planet gear, on one side of said shaft portion including the largest diameter gear surface engageable with the drive annular gear and a rotary journalling at the end of the planetary gear, and the planetary gear including on the other side of said shaft portion the smallest of said gear surfaces engageable with both a sun annular gear and a ring annular gear.

35. A multi-speed planetary gear comprising, a casing, a primary shaft and a secondary shaft, each of said shafts being journalled with respect to the casing, a planet carrier drivingly connected to one of said shafts, at least one planet gear rotatively mounted on said planet carrier, said planet gear having at least two gear surfaces of different diameters, at least three annular gears, one of said annular gears being a drive annular gear engaged with the shaft other than the shaft with which the planet carrier is drivingly connected, each of the remaining annular gears being engageable with one of the planet gears surfaces, such that each gear surface has at least one annular gear engageable therewith, coupling means associated with gear of said remaining annular gears for connecting it against rotation relative to the casing, and a coupling means for connecting the primary and secondary shafts together for direct drive, and including servo-motor means for connecting each of the said coupling means, each of said servo-motor means being mounted in the casing against rotation ralative to the casing, said coupling means for direct drive being a friction coupling means for drivingly engaging the planet carrier to the said second one of said shafts for direct drive, and including bearings for journalling said annular gears, and the force path from the direct drive servo-motor to the said direct drive friction coupling passing over at least one of said bearings.

36. A multi-speed planetary gear according to claim 35, wherein the drive annular gear is a ring gear.

37. A multi-speed planetary gear according to claim 35, wherein the drive annular gear is a sun gear.

* * * * *